United States Patent [19]
Daute et al.

[11] Patent Number: 5,403,440
[45] Date of Patent: Apr. 4, 1995

[54] USE OF COMPOUNDS CONTAINING POLYETHER CHAINS PREPARED FROM EPOXIDIZED CARBOXYLIC ACID DERIVATIVES FOR THE REMOVAL OF PRINTING INKS FROM WASTEPAPER

[75] Inventors: Peter Daute, Essen; Berthold Schreck, Duesseldorf; Klaus Hornfeck, Mettmann, all of Germany

[73] Assignee: Henkel Kommanditgesellschaft auf Aktien, Germany

[21] Appl. No.: 39,105

[22] PCT Filed: Sep. 30, 1991

[86] PCT No.: PCT/EP91/01869

§ 371 Date: Apr. 8, 1993

§ 102(e) Date: Apr. 8, 1993

[87] PCT Pub. No.: WO92/06240

PCT Pub. Date: Apr. 16, 1992

[30] Foreign Application Priority Data

Oct. 9, 1990 [DE] Germany .................... 40 32 050.2

[51] Int. Cl.⁶ .................................................. D21C 5/02
[52] U.S. Cl. .............................................. 162/5; 162/8
[58] Field of Search ................................. 162/5, 6, 8

[56] References Cited

U.S. PATENT DOCUMENTS

| | | | |
|---|---|---|---|
| 4,964,949 | 10/1990 | Hamaguchi et al. | 162/5 |
| 5,100,574 | 3/1992 | Urushibata et al. | 162/5 |
| 5,120,397 | 6/1992 | Urushibata et al. | 162/5 |
| 5,158,697 | 10/1992 | Kawamori et al. | 162/5 |
| 5,221,433 | 6/1993 | Daute et al. | 162/5 |
| 5,223,089 | 6/1993 | Kato | 162/5 |

FOREIGN PATENT DOCUMENTS

| | | |
|---|---|---|
| 3401444 | 7/1984 | Germany . |
| 3923393 | 1/1991 | Germany . |
| 53-52705 | 5/1978 | Japan . |
| 1347971 | 2/1974 | United Kingdom . |
| 9111424 | 8/1991 | WIPO . |

OTHER PUBLICATIONS

American Oil Chemists' Society Chic Journal, vol. 45, May 1968, K. L. Johnson: "New Nonionic Detergents Derived from Epoxidized Oils. IV.1", pp. 374–376.

Wochenblatt für Papierfabrikation 17, Seiten 646–649 (1985).

Ullmanns Encyclopädie der techn. Chemie, 4. Auflage Band 17, Seiten 570–571 (1979).

Primary Examiner—Karen M. Hastings
Attorney, Agent, or Firm—Ernest G. Szoke; Wayne C. Jaeschke; Real J. Grandmaison

[57] ABSTRACT

The invention relates to the use of compounds containing polyether chains prepared by reaction of epoxidized $C_{10-22}$ carboxylic acid derivatives with polyalkylene glycols having average molecular weights of 100 to 2,000 and/or certain alkoxylated aliphatic compounds for the removal of printing inks from printed wastepaper and/or paper circuit waters.

11 Claims, No Drawings

USE OF COMPOUNDS CONTAINING POLYETHER CHAINS PREPARED FROM EPOXIDIZED CARBOXYLIC ACID DERIVATIVES FOR THE REMOVAL OF PRINTING INKS FROM WASTEPAPER

BACKGROUND OF THE INVENTION

1. Field of the Invention

This invention relates to the use of compounds containing polyether chains prepared by reaction of epoxidized $C_{10-22}$ a carboxylic acid derivatives with polyalkylene glycols having average molecular weights of 100 to 2,000 and/or certain alkoxylated aliphatic compounds for the removal of printing inks from printed wastepaper and/or paper circuit waters.

Today, wastepaper is used in large quantities for the production of, for example, newsprint and sanitary paper. Lightness and color are important quality features for papers of this type. To achieve this, the printing inks have to be removed from the printed wastepaper. This is normally done by deinking processes essentially comprising two steps, namely:

1. disintegrating the wastepaper, i.e. fiberizing in water in the presence of the chemicals required for detachment of the printing ink particles and
2. removal of the detached printing ink particles from the fiber suspension.

The second step can be carried out by washing or flotation (Ullmanns Encyclopädie der technischen Chemie, 4th Edition, Vol. 17, pages 570–571 (1979)). In flotation, which utilizes the difference in wettability between printing inks and paper fibers, air is forced or drawn through the fiber suspension. Small air bubbles attach themselves to the printing ink particles and form a froth at the surface of the water which is removed by savers.

The deinking of wastepaper is normally carried out at alkaline pH values in the presence of alkali metal hydroxides, alkali metal silicates, oxidative bleaches and surfactants at temperatures in the range from 30° to 50° C. Anionic and/or nonionic surfactants, for example soaps, ethoxylated fatty alcohols and/or ethoxylated alkyl phenols are mainly used as surfactants (Wochenblatt für Papierfabrikation 17, 646 to 649 (1985)).

2. Discussion of Related Art

German patent application DE 31 01 444 relates to a process for the deinking of wastepaper using a compound corresponding to the following general formula

$$RCOO-(CH_2CH_2O)_m-(AO)_n-R'$$

in which R is a $C_{7-21}$ alkyl or alkenyl group, R' is a hydrogen atom or a $C_{1-18}$ alkyl, alkenyl or acyl group, AO represents $C_3H_6O$ or $C_4H_8O$ groups or a mixture of $C_2H_4O$, $C_3H_6O$ and $C_4H_8O$ groups, m is an integer of 1 to 100 and n is an integer of 1 to 100.

The use of ethoxylated castor oils for the deinking of printed wastepaper is known, for example, from JP 78/52705, reported in Chem. Abstr. 89, 131445j (1978), and from DE 21 48 590. The Japanese patent describes mixtures of castor oil with 10 to 400% ethylene oxide and ethoxylated nonylphenol which are suitable for the removal of printing inks from printed wastepaper. The process protected in DE-PS 21 48 590 is concerned with organic materials, for example paper, which are bleached with sodium chlorite in the presence of organic compounds containing at least one ethylene oxide and/or propylene oxide unit. Suitable organic compounds containing at least one alkylene oxide unit include inter alia ethoxylated castor oil.

However, where ethoxylated castor oils are used for removing printing inks from wastepaper, it has to be accepted that the quantities of castor oil and, hence, ethoxylated castor oils available on the market are subject to considerable fluctuations. Poor harvests in the main areas of cultivation, namely Brazil and India, result in shortages of the starting material, castor oil, at more or less long intervals. Accordingly, there is a need for a substitute for ethoxylated castor oils which, when used for the removal of printing inks from wastepaper, are at least comparable with the product to be replaced in regard to the deinking results obtained. Above all, the substitute product should be readily obtainable from a broader raw material base less vulnerable to crises and should be both ecologically and toxicologically safe.

DESCRIPTION OF THE INVENTION

It has now been found that compounds containing polyether chains prepared from epoxidized $C_{10-22}$ carboxylic acid derivatives are eminently suitable as a replacement for ethoxylated castor oils for deinking wastepaper. It has also been found that printing inks can also be removed from paper circuit waters with good results using compounds containing polyether chains prepared from epoxidized $C_{10-22}$ carboxylic acid derivatives.

Accordingly, the present invention relates to the use of compounds containing polyether chains prepared by reaction of epoxidized $C_{10-22}$ carboxylic acid derivatives with polyalkylene glycols having average molecular weights of 100 to 2,000, alkoxylated aliphatic $C_{1-22}$ alcohols, alkoxylated aliphatic amines, alkoxylated aliphatic $C_{1-22}$ carboxylic acids and/or alkoxylated aliphatic $C_{1-22}$ carboxylic acid amides for the removal of printing inks from printed wastepaper and/or circuit waters.

Epoxidized carboxylic acid derivatives are reacted in known manner with, preferably, polyethylene glycols having average molecular weights of 100 to 2,000, aliphatic $C_{1-22}$ alcohols alkoxylated with 5 to 30 mol ethylene oxide, for example ethoxylated methanol and/or ethoxylated fatty alcohols, aliphatic amines alkoxylated with 5 to 30 mol ethylene oxide, for example ethoxylated propylamine, dodecylamine, stearylamine, oleylamine and/or coconut oil amine, aliphatic $C_{1-22}$ carboxylic acids and/or amides alkoxylated with 5 to 30 mol ethylene oxide, for example ethoxylated propionic acid, stearic acid, oleic acid and/or coconut oil fatty acid, in the presence of catalysts, for example sulfuric acid or boron trifluoride, at temperatures of 20° to 190° C. (J. Am. Oil Chem. Soc. 45, 374 (1968)). More preferably, the reactions are carried out with polyethylene glycols having average molecular weights of 500 to 1,000, aliphatic $C_{1-22}$ a alcohols alkoxylated with 5 to 30 mol ethylene oxide and/or aliphatic amines alkoxylated with 5 to 30 mol ethylene oxide.

The epoxidized $C_{10-22}$ carboxylic acid derivatives used as educts for the preparation of the compounds containing polyether chains according to the invention may be obtained by epoxidation of unsaturated $C_{10-22}$ carboxylic acid derivatives. According to DE-PS 857 364, unsaturated carboxylic acid derivatives may be obtained by reaction with peracetic acid in the presence of acidic catalysts or with performic acid formed insitu from formic acid and hydrogen peroxide. The epoxidation products obtained have iodine values below 20 and preferably below 15. Suitable unsaturated carboxylic acid derivatives are any carboxylic acid derivatives of natural and/or synthetic origin which are free from OH groups and contain carboxylic acid residues with at least 1 or 2 double bonds in the 9 and/or 13 position, for example 9c-dodecenoic acid, 9c-tetradecenoic acid, 9c-hexadecenoic acid, 9c-octadecenoic acid, 9t-octadecenoic acid, 9c,12c-octadecadienoic acid, 9c,12c,15c-octadecatrienoic acid, 9c-eicosenoic acid and/or 13c-docosenoic acid derivatives and/or mixtures having at least a high content of such unsaturated carboxylic acid derivatives. Unsaturated carboxylic acid derivatives containing $C_{16-22}$ carboxylic acid residues with at least 1 or 2 double bonds in the 9 and/or 13 position are preferred. Suitable unsaturated carboxylic acid derivatives are, for example, unsaturated carboxylic acid esters, unsaturated carboxylic acid amides, unsaturated carboxylic acid mono- and/or -di-$C_{1-4}$-alkylamides and/or unsaturated carboxylic acid mono- and/or -di-$C_{1-4}$-alkanolamides. Unsaturated carboxylic acid alkyl esters containing 1 to 18 carbon atoms in the monohydric alcohol radical and/or mono-, di- and/or triglycerides containing carboxylic acid residues with at least 1 or 2 double bonds in the 9 and/or 13 position are preferred.

Examples of unsaturated $C_{10-22}$ carboxylic acid $C_{1-18}$ alkyl esters, which may be obtained in known manner by esterification of the corresponding unsaturated carboxylic acids free from OH groups or by transesterification of the corresponding mono-, di- and/or triglycerides with $C_{1-18}$ alkyl alcohols, for example methanol, ethanol, propanal, butanol, isobutanol, 2-ethyl hexanol, decanol and/or stearyl alcohol, are palmitoleic acid methyl ester, oleic acid methyl ester, oleic acid ethyl ester, oleic acid isobutyl ester, oleic acid 2-ethyl hexyl ester and/or oleic acid decyl ester and/or $C_{10-22}$ carboxylic acid $C_{1-18}$ alkyl ester mixtures having at least a high content of such $C_{10-22}$ carboxylic acid $C_{1-18}$ alkyl esters, which contain at least one or two double bonds in the 9 and/or 13 position in the carboxylic acid components, such as palm oil fatty acid methyl ester, soybean oil fatty acid methyl ester, soybean oil fatty acid 2-ethylhexyl ester, rapeseed oil fatty acid methyl ester and/or tallow fatty acid ethyl ester. Suitable mono-, di- and/or triglycerides containing OH-free unsaturated $C_{10-22}$ carboxylic acid residues with at least one or two double bonds in the 9 and/or 13 position, are in particular fats and/or oils of natural origin of which the carboxylic acid content consists predominantly of unsaturated $C_{10-22}$ carboxylic acids with at least one or two double bonds in the 9 and/or 13 position, preferably predominantly of unsaturated $C_{16-22}$ carboxylic acids with at least one or two double bonds in the 9 and/or 13 position, such as olive oil, linseed oil, sunflower oil, safflower oil, soybean oil, peanut oil, cottonseed oil, rapeseed oil rich and/or poor in erucic acid, palm oil, lard and/or tallow.

The compounds containing polyether chains to be used in accordance with the invention are added to paper stock suspensions in quantities of preferably 0.02 to 2% by weight and, more preferably, 0.1 to 0.8% by weight, based on air dry paper stock. Air-dry paper stock means that an equilibrium state of internal moisture has established itself in the paper stock. This equilibrium state depends both on the temperature and on the relative humidity of the air.

In many cases, the deinking result, i.e. the removal of printing inks from printed wastepaper, can be improved by using the compounds containing polyether chains according to the invention in combination with, for example, $C_{10-22}$ fatty acids, ethoxylated $C_{6-22}$ alkyl alcohols, ethoxylated alkylphenols, polymers, such as polyacrylamides and/or polydimethylaminoethyl methacrylate, and/or copolymers of the type described, for example, in DE 38 39 479. The total quantity of these optional constituents is between 0.1 and 1% by weight, based on air-drypaper stock.

In the presence of compounds containing polyether chains, water-dilutable and/or solvent-containing printing inks, for example rotary newsprint inks, book printing inks, offset printing inks, illustration intaglio printing inks, flexographic printing inks, laser printing inks and/or packaging intaglio printing inks, may be removed from printed wastepaper, for example newspapers, magazines, computer paper, Journals, brochures, forms, telephone directories and/or catalogs. The wastepaper deinked in the presence of the compounds to be used in accordance with the invention is distinguished by very high degrees of whiteness.

Printing inks may be removed from wastepaper, for example, by the following process: Printed wastepaper is refined in a pulper at 20° to 60° C. at a stock consistency of, for example, 1 to 5% by weight in an aqueous solution typically containing 0 to 1.5% by weight hydrogen peroxide (100%), 0 to 2.5% by weight sodium hydroxide (99% by weight), 0 to 4.0% by weight soda waterglass, solids content 35% by weight, 0.02 to 2% by weight compounds containing polyether chains according to the invention and 0 to 1% by weight of the optional constituents mentioned above (all percentages by weight based on air-dry wastepaper). After a residence time of typically 60 to 120 minutes at temperatures in the range from 20° to 60° C., the paper stock suspensions are stirred into water or water is added to them so that 0.6 to 1.6% by weight stock suspensions are obtained. The detached printing ink particles are then removed from the stock suspensions in known manner by washing out or by flotation. Flotation is preferably carried out in known manner, for example in a Denver flotation cell.

Where compounds containing polyether chains are used, printing inks are removed both from the wastepaper and from the circuit water. The compounds to be used in accordance with the invention may also be used for the separate treatment of paper circuit waters. In cases such as these, the printing ink particles are removed, for example by filtration or flotation, after the addition of 2 to 100 mg of compounds containing polyether chains per liter circuit water.

EXAMPLES

Preparation of compounds containing polyether chains

Example 1

Reaction of soybean oil epoxide with polyethylene glycol methyl ether 256 g soybean oil epoxide (approximate fatty acid composition: 8% palmitic acid, 4% stearic acid, 28% oleic acid, 53% linoleic acid, 6% linolenic acid; epoxide content=6.73% by weight, iodine value=5; acid value=0.4), 1,009 g polyethylene glycol methyl ether having an average molecular weight of 1,000 (OH value (OHV)=60) and 4.1 g concentrated sulfuric acid were heated with stirring to 110°–115° C. After 6 hours, the reaction was terminated and the reaction mixture was neutralized with 4.5 g diethyl ethanolamine. The liquid, dark yellow, cloudy product obtained had an OHV of 65.

Example 2

Reaction of soybean oil epoxide with polyethylene glycol having an average molecular weight of 2,000

238 g soybean oil epoxide (characteristic data as in Example 1), 2,000 g polyethylene glycol having an average molecular weight of 2,000 (OHV=56) and 2.5 g concentrated sulfuric acid were heated with stirring to 110°–120° C. After 2.5 hours, the reaction was terminated. After neutralization with 2.5 g diethyl ethanolamine, a yellow wax having an OHV of 64 was obtained.

Example 3

Reaction of soybean oil epoxide with tallow alcohol.14 mol ethylene oxide 233 g soybean oil epoxide (fatty acid composition as in Example 1; epoxide content=6.88% by weight; iodine value=5; acid value=0.4), 818 g tallow alcohol.14 mol ethylene oxide (OHV=69) and 5.0 g concentrated sulfuric acid were heated with stirring to 100°–110° C. After 5.5 hours, the reaction was terminated. After neutralization with 5 g diethyl ethanolamine, a yellow wax having an OHV of 69 was obtained.

Example 4

Reaction of soybean oil epoxide with polyethylene glycol having an average molecular weight of 600

233 g soybean oil epoxide (characteristic data as in Example 3), 780 g polyethylene glycol having an average molecular weight of 600 (OHV=187) and 3.9 g sulfuric acid were heated with stirring to 100°–110° C. After 4 hours, the reaction was terminated and the reaction mixture was neutralized with 4.1 g diethyl ethanolamine. The yellow liquid obtained had an OHV of 148.

Example 5

Reaction of soybean oil epoxide with stearylamine.25 mol ethylene oxide 190 g soybean oil epoxide (characteristic data as in Example 3), 992 g stearylamine.25 mol ethylene oxide (OHV=92.3) and 0.4 g 30% by weight methanolic potassium hydroxide solution were heated with stirring to 160°–180° C. After 14 hours, the reaction was terminated (epoxide content:<0.16% by weight) and the reaction mixture was bleached with 10 ml sodium hypochlorite solution. The dark brown liquid obtained had an OHV of 98.6 and an amine value of 36.5.

Example 6

Reaction of soybean oil epoxide with stearic acid.20 mol ethylene oxide 120 g soybean oil epoxide (characteristic data as in Example 3), 533 g stearic acid.20 mol ethylene oxide (OHV=52.7, acid value=0.2) and 1 g concentrated sulfuric acid were heated with stirring to 110°–120° C. After 5 hours, the reaction was terminated and the reaction mixture was neutralized with 2.8 g diethyl ethanolamine. The yellow solid obtained had a saponification value of 73 and an acid value of 2.1.

Application Examples

Removal of printing ink from alkaline medium 17.5 g air-dry (=16.5 g bone-dry for 5.7% moisture;) printed wastepaper consisting of 50% by weight newspapers and 50% by weight magazines were disintegrated for 10 minutes at 45° C. (stock consistency 3.5% by weight) in a Multimixer, stage 2, with an aqueous solution containing 2.0% by weight soda waterglass, solids content 35% by weight (37°–40° Be), 0.7% by weight hydrogen peroxide (100%), 1.0% by weight sodium hydroxide, (99% by weight) and 0.2% by weight compound containing polyether chains (all percentages by weight are based on air-dry paper stock). After standing for 105 minutes at 45° C., the pulp was diluted with water to a consistency of 1% by weight. The fiber suspension was then floated for 12 minutes at 45° C. in a Denver laboratory flotation cell at 100 revolutions per minute. After flotation, the pulp was separated from the water on a nutsch filter, formed into a sheet between two filter papers on a photo dry press and dried for 90 minutes at 100° C.

The deinking results are shown in Table 1. The deinkability value (DEM) was calculated from the reflection factors $R_{457nm}$ (whiteness) of the printed (BS), deinked (DS) and unprinted (US) paper stock in accordance with the following formula:

$$DEM\ (\%) = \frac{\text{whiteness }(DS) - \text{whiteness }(BS)}{\text{whiteness }(US) - \text{whiteness }(BS)} \times 100$$

(0% means no deinking, 100% means quantitative deinking).

In every case, the circuit water was clear.

TABLE 1

| Compound containing polyether chains used, prepared in accordance with Example No. | $R_{457}$[1] (US) | $R_{457}$[1] (BS) | $R_{457}$[1] (DS) | DEM (%) |
|---|---|---|---|---|
| 1 | 64.4 | 43.0 | 52.1 | 43 |
| 2 | 64.4 | 43.0 | 51.5 | 40 |
| 3 | 64.4 | 43.0 | 57.4 | 67 |
| 4 | 64.4 | 43.0 | 55.5 | 58 |
| 5 | 64.4 | 43.0 | 58.2 | 71 |
| 6 | 64.4 | 43.0 | 57.5 | 68 |

[1] $R_{457}$ means $R_{457\ nm}$

We claim:

1. The process of removing printing inks from printed wastepaper and paper circuit waters comprising disintegrating said wastepaper in water in the presence of chemicals suitable for detachment of printing ink particles from said wastepaper and form a suspension thereof, treating said suspension in an amount effective to deink said suspension with a compound containing polyether chains prepared by reaction of an epoxidized $C_{10}$-$C_{22}$ carboxylic acid derivative obtained by epoxidation of unsaturated $C_{10}$-$C_{22}$ carboxylic acid derivatives with peracetic or performing acid and then with a compound selected from the group consisting of polyalkylene glycols having an average molecular weight of 100 to 2,000, alkoxylated aliphatic $C_1$-$C_{22}$ alcohols, alkoxylated aliphatic amines, alkoxylated aliphatic $C_1$-$C_{22}$ carboxylic acid amides, and then removing from said suspension detached printing ink particles by flotation or washing.

2. A process as in claim 1 wherein said aliphatic $C_1$-$C_{22}$ alcohols are alkoxylated with 5 to 30 mol ethylene oxide, said aliphatic amines are alkoxylated with 5 to 30 mol ethylene oxide, said aliphatic $C_1$-$C_{22}$ carboxylic acids are alkoxylated with 5 to 30 mol ethylene oxide, and said aliphatic $C_1$-$C_{22}$ carboxylic acid amides are alkoxylated with 5 to 30 mol ethylene oxide.

3. A process as in claim 1 wherein the polyalkylene glycols have an average molecular weight of 500 to 1,000.

4. A process as in claim 1 wherein said compound containing polyether chains is prepared by reaction with an epoxidized $C_{16}$-$C_{22}$ carboxylic acid derivative.

5. A process as in claim 1 wherein said compound containing polyether chains is prepared by reaction with an epoxidized $C_{10}$-$C_{22}$ carboxylic acid $C_1$-$C_{18}$ alkyl ester.

6. A process as in claim 1 wherein said compound containing polyether chains is prepared by reaction with an epoxidized carboxylic acid mono-, di- or tri-glyceride.

7. A process as in claims 1 wherein said compound containing polyether chains is present in said suspension in an amount of 0.02 to 2% by weight, based on the weight of air-dry paper stock.

8. A process as in claim 1 wherein said wastepaper comprises paper printed with water-dilutable or solvent-containing printing inks.

9. A process as in claim 1 wherein said step of disintegrating said wastepaper in water is conducted at a temperature of 20° C. to 60° C.

10. A process as in claim 9 wherein said wastepaper is present in the suspension formed in an amount of from 1% to 5% by weight.

11. A process as in claim 10 wherein said suspension contains 0 to 1.5% by weight hydrogen peroxide (100%), 0 to 2.5% by weight sodium hydroxide (99%/wt.), and 0 to 4% by weight soda waterglass (35%/wt. solids).

* * * * *